(12) United States Patent
Kemp

(10) Patent No.: US 6,385,908 B1
(45) Date of Patent: May 14, 2002

(54) PLANTER MODIFICATION SYSTEM

(76) Inventor: John M. Kemp, 4511 Lucksinger La., Austin, TX (US) 78745

( * ) Notice: Subject to any disclaimer, the term of this patent is extended or adjusted under 35 U.S.C. 154(b) by 0 days.

(21) Appl. No.: 09/621,308

(22) Filed: Jul. 20, 2000

Related U.S. Application Data

(63) Continuation-in-part of application No. 09/241,173, filed on Feb. 1, 1999, now abandoned.

(51) Int. Cl.[7] .............................................. A01G 25/00
(52) U.S. Cl. ........................................................ 47/79
(58) Field of Search ................................ 47/38, 71, 79, 47/80, 81, 82

(56) References Cited

U.S. PATENT DOCUMENTS

| | | | | |
|---|---|---|---|---|
| 2,983,076 A | * | 5/1961 | Merrill | 47/79 |
| 4,023,305 A | * | 5/1977 | Harschel | 47/81 |
| 4,882,875 A | * | 11/1989 | Green | 47/79 |
| 4,991,345 A | * | 2/1991 | Bloch | 47/79 |
| 5,062,239 A | * | 11/1991 | Helton | 47/79 |
| 5,502,924 A | * | 4/1996 | Lee | 47/79 |
| 5,553,418 A | * | 9/1996 | Mason et al. | 47/79 |
| 5,596,839 A | * | 1/1997 | Ellis-El | 47/79 |

* cited by examiner

*Primary Examiner*—Charles T. Jordan
*Assistant Examiner*—Bret Hayes
(74) *Attorney, Agent, or Firm*—David G. Henry

(57) ABSTRACT

The present invention provides a planter conversion system and associated method of use thereof, which allows the modification of existing planters and existing planter designs such that plants contained therein can easily be cared for in an optimum manner with respect to the saturation and dehydration of the plant, while at the same time, avoiding the inconvenience, potential mess, and threat to plant health, all of which are associated with presently known and practiced plant care methodologies which involve existing planter designs. The system includes a perforated water reservoir to which is attached a water siphon tube which, when installed, extends from the water reservoir at the bottom of a planter, over the top edge of the planter, and to a point below the outside, bottom of the planter. A suction application device is prescribed to be attached to the distal end of the water siphon tube to initiate a syphoning action to remove water from the planter after a saturation phase is completed, and to transition to a dehydration stage for the plant.

2 Claims, 2 Drawing Sheets

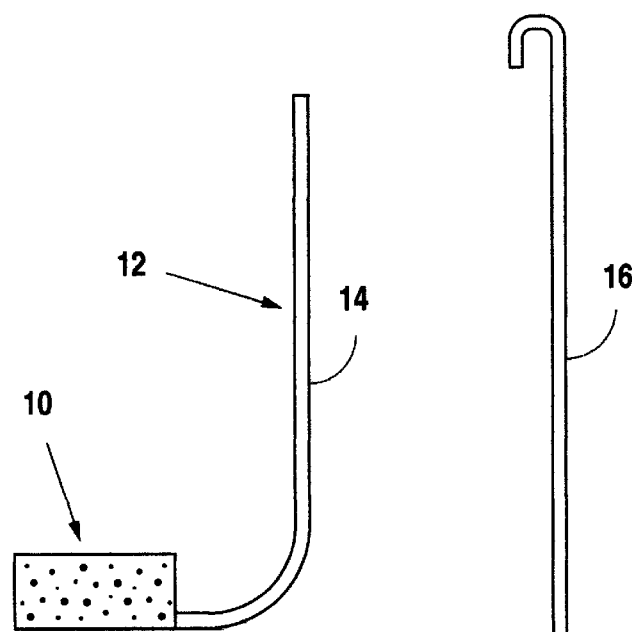
Fig. 1
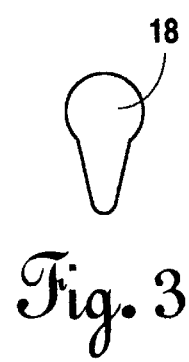
Fig. 2
Fig. 3
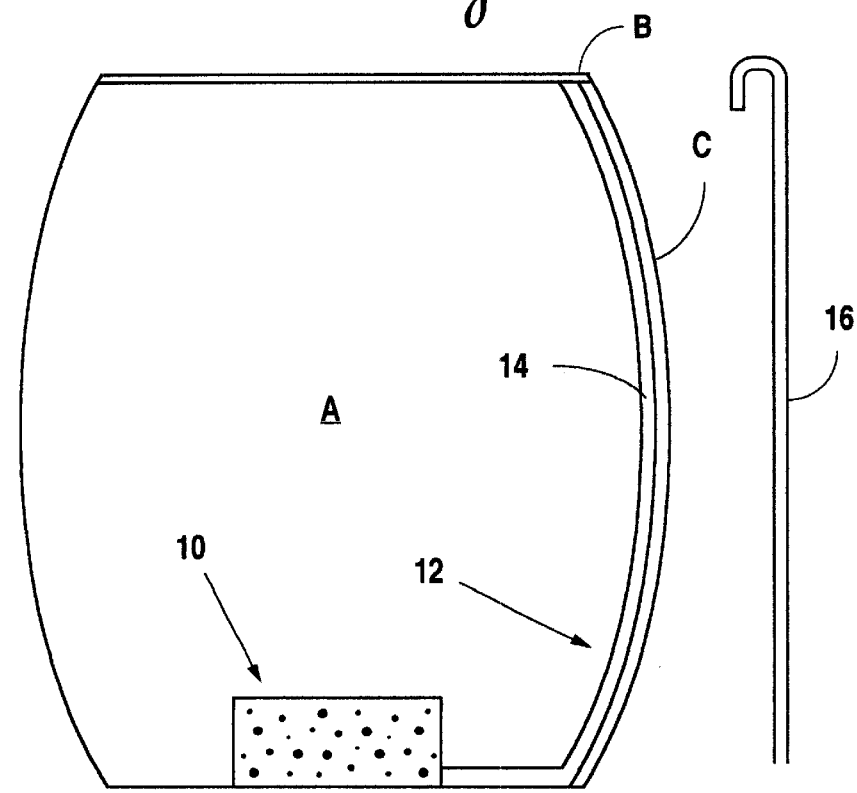
Fig. 4

PLANTER MODIFICATION SYSTEM

This application is a continuation in part of 09/241,173, filed Feb. 1, 1999, abandoned.

FIELD OF THE INVENTION

This invention teaches a planter modification system and associated method of use which permits users to modify conventional planters and planter designs to greatly improve their capacity to properly care for potted plants by way of facilitating a cycle of saturation and dehydration of the potted plant.

BACKGROUND OF THE INVENTION

Most plant containers have drainage apertures in their bottoms. They also frequently have permanent reservoirs to provide for a certain amount of water to moisten the soil through the process of osmosis and capillary action amongst dirt particles. Still other containers have removable reservoirs which can be snapped into place.

Planters with reservoirs also have the tendency to overflow as the planters are inadvertently over-filled. If this occurs on or near expensive furniture, carpets or wood floors, this can represent a serious occurrence in any household. Also, water which stands in such reservoirs tends to quickly stagnate and create a detrimental condition known colloquially as "wet feet" or "root rot."

Planters which do not have reservoirs have apertures that discharge water as soon as it reaches the planter's bottom. This is particularly true when the soil in a container is very dry, and voids and cracks form around the parameter of the planter. Under such conditions, the plant which is watered simply by adding water at the top of the soil benefits little from the watering.

Some of the inadequacies of presently available planters are reflected, at least in part, in a recent Better Homes and Gardens publications entitled the "New Houseplants Book":

> The best pots have holes in their bottoms for excess water to drain out. If water collects in the bottom of a pot, it can cause root rot, which eventually kills plants. Because of these holes, each pot needs a plastic or clay saucer underneath it to prevent excess water from spilling onto your carpet, floor, or furniture. Many hanging pots have built-in saucers to collect excess water. Be careful when watering plants in these pots since their saucers are shallow and water sometimes overflows.

Whatever a plant lover's level of patience for water spillage, inefficient watering, etc. through use of presently available planters, none of these planters adequately provide for the proper management of a potted plant's state of moisture saturation or dehydration. Consequently, plants in containers are often improperly watered and, at best, do not thrive to their natural potential, or, at worst, eventually die.

For reasons mentioned above, if the soil in a container is very dry, it is sometimes necessary to submerge the container in a water-filled tub to thoroughly saturate the soil. At present, this is typically done in a secondary reservoir (a large tub, usually) which will accommodate an entire planter with the subject potted plant therein. Not only is complete soil saturation sometimes necessary, it is, for most plants, almost always desirable and beneficial.

The ability to nearly fill a planter with water, yet later drain the planter, provides necessary phases in the any proper watering regiment. Author W. E. Shewell-Cooper, in the book titled "How to Grow Potted Plants" T provided the following illuminating discussion:

> Put yourself, therefore, imaginatively in the place of the plant—and discover its every need. The soil in which you were growing is completely cut off from the great bulk of soil in the earth. You are isolated. You are in a room in which it never rains. When all the moisture in the ball of soil has been used up by your roots, there is no more to draw on and, in fact, the ball of soil in which you are growing shrinks, so much that there's actually a space between the rim of the ball and the inside rim of the pot.

Another authoritative source on proper watering of potted plants provides:

McCall's Garden Book

"The best way (especially for plants that dry out rapidly) is to set the pot in a container of water that is at room temperature. Water should be ½ inch below pot's rim if you are using a porous pot (common clay pot). Let it sit for a couple of hours, or until the soil becomes moist on top. If you are using a non porous pot, such as glazed pottery, water should be 1 inch over pot's rim. Let it sit for 15 minutes or until bubbles stop arising from the pot. In either case you will want to set the pot where it can drain afterward."

"Containers with no drainage holes are attractive, but so difficult to water successfully that they are not recommended." (emphasis added)

New Illustrated Encyclopedia of Gardening

Edited by T. H. Everett-Assistant Director (Horticulture) and Curator of Education The New York Botanical Garden With contributions from Twenty Horticulturists and Authorities in the United States and Canada Other pertinent quotes pertaining to the need to thoroughly water potted plants is provides as follow:

"Although one cannot say how often a plant should be watered it is quite possible to indicate how much water should be given at each application: enough thoroughly to soak the entire mass of soil."

Luster Leaf Products, Inc.

Woodstock, Ill.

"The term over watering is sometimes misunderstood. Over watering refers to an excessive frequency of watering-not to the amount of water applied at any given time. Some plant owners kill with kindness by adding water before the plant really needs it. The result of this over watering is, inevitably rootrot."

Container Gardening Indoors and Out Jack Kramer

"Water indoor plants thoroughly and deeply and allow them to dry out before watering them again. If possible, soak plants once a week in a tub of water for several hours or until the soil stops bubbling. This gives complete watering and keeps the root ball from drawing away from the container walls causing a well. Remember that if soil becomes bone dry, the root ball shrinks and water runs down the sides of the pot rather than into the roots."

Although this approach of total hydration to dehydration is ideal, it presents many problems. Large plants may weigh 50 or more pounds. Such larger containers frequently contain plants 6 feet or more in height. This type of planter, for example, may be indoors and on the second floor of a two story home. Containers of this size, if totally soaked as recommended, would require watering only every four to six weeks.

The present invention allows one to convert commonly used planters of all types for a cost comparable to the average cost of a saucer. Once modified, one need only to fill the planter and let the water stand until all of the air bubbles have disappeared. Since the planter has no apertures, any danger of spillage is eliminated. Water with only one half of the normally recommended amount of fertilizer will suffice. When the proper time has transpired after the planter has been filled (usually 15 to 30 minutes), draining time can be less than 30 seconds to approximately 4 minutes, depending upon the size of the planter. Water drained can be used in other planters. During this process, the planter is never moved.

In most cases, modifying new planters would result in the lowering of costs due to simplification and the elimination of such items as snap-on reservoirs. Most ceramic planters have small integral saucers that are cosmetically unattractive and totally impractical. Many such planters have brightly colored labels warning buyers of possible damage from water overflow. (See photo #1)

The present invention enables one to care for plants in containers with minimal time and effort. It also enables one to have planters under circumstances that formerly made watering so involved and difficult any considerations for having a planter were abandoned.

Summary of the Invention

In view of the foregoing, it is an object of the present invention to provide a device and associated methodology which facilitates the proper moisture management of houseplants using existing planters.

It is another object of the present invention to provide a device and associated methodology of use which obviates the need to fully submerge a planter in a water-filled reservoir in order to fully saturate a plant in a conventional planter.

It is yet another object of the present convention to provide a device and associated methodology which eliminates the problems associated with saturating a plant by having to block drain hole(s) of a conventional planter, filling the planter with water, and thereafter not being able to evacuate the water and thereby promoting root rot.

It is still another object of the present invention to provide a device and associated methodology which will allow a plant owner to fully saturate a plant in its own container (including a conventional planter, the drain holes of which have been plugged) yet easily, and in a controlled manner, evacuate the water after an appropriate time of full saturation, and at a time which is convenient to the plant owner.

It is another object of the present invention to provide a device and associated methodology for retrofitting existing planters to render them more useful and manageable in the proper care of plants through the implementation of optimal saturation and de-saturation plant care regimens.

In satisfaction of the foregoing objectives, the present invention provides a planter conversion system and associated method of use thereof, which allows the modification of existing planters and existing planter designs such that plants contained therein can easily be cared for in an optimum manner with respect to the saturation and dehydration of the plant and its growth medium, while at the same time, avoiding the inconvenience, potential mess, and threat to plant health, all of which are associated with presently known and practiced plant care methodologies which involve existing planter designs.

The device and associated methodology of the present invention allows for the conversion of conventional planters and conventional planter designs to facilitate an optimal watering regimen for potted plants, while virtually eliminating the danger of water spillage and other problems outlined above. Users of planters which are modified or designed according to the present invention need never experience ruined furniture or carpets from the overflowing of a planter's water reservoir, root rot of a prized potted plant, the physical strain and mess of submerging conventional planters, or marginal plant development through improper moisture management.

The system of the present invention includes a water reservoir which has in the preferred embodiment, a suggested capacity of 15 to 20 percent of the total amount of water needed to fill an empty planter to the anticipated soil level. The reservoir is highly perforated and has an outlet to receive a siphon tube, the proximal end of which is in fluid communication with the interior space of the water reservoir.

The water siphon tube is prescribed to be a pliable, preferably clear, plastic tubing which is, in any given application, of a sufficient length that, when the water reservoir of the system resides at (or is molded into) the bottom of a planter with which the present system is used or incorporated, the tube will extend to the top edge of the planter and extend further still over the top edge and down the outside of the planter such that the siphon tube's distal end resides at an elevation approximately equal to that of the water reservoir inside the planter. The water siphon tube may, instead of being a single length, be jointed such that a first portion only extends from the water reservoir to the upper rim of the planter, and a detachable, second length will complete the over-all length as just described.

The preferred embodiment of the present system will include, in its retail form, an siphon tube, whether a singular length, or jointed, of sufficient length to satisfy the described criteria for planters of virtually any reasonable size, which tube, in the context of a retrofitting kit for existing planters, can easily be trimmed to a desired length by the purchaser.

The present system further includes, or is at least intended to be used with, a suction application device, such as a rubber-like bulb which is configured for substantially sealed engagement with the distal end of the water siphon tube (or, if applicable, the distal end of the second segment thereof). The suction application device should be of a capacity and operating characteristic that one actuation thereof should draw water from a collection of water in which the water reservoir is submerged (presumably at the bottom of the planter with which the present system is being used), through the water siphon tube to the distal end of the tube to which the suction application device is attached, thereby initiating a syphoning action (provided that the distal end of the water siphon tube is maintained lower than the water level in the planter). If, in fact, the distal end of the water siphon tube is maintained lower than the proximal end thereof inside the planter and at the bottom thereof, this syphoning action will drain all water which fills a planter and migrates to the water reservoir therein. When a user wishes to stop the flow of water from the planter, he or she need only raise the water siphon tube to an elevation above that of the water level in the planter, and the syphoning action will be defeated.

As implied in the preceding paragraph, the water reservoir permits water to migrate into the space defined therein, through the many perforations, while keeping most soil particles outside the interior space of the water reservoir. In the preferred embodiment of the present invention, perforations should be no larger than approximately 3/16th of an inch in diameter (preferably in the 1/16th to 3/16th range) to allow water to migrate therethrough, but preferably to exclude most dirt from the interior of the water reservoir.

As can be appreciated from the above discussion, once installed, the planter modification kit of the present invention permits a plant owner to plug the drain orifice(s) of an existing planter to allow complete filling thereof and for maintaining a fully saturated state for any desired period of time, but to thereafter easily evacuate excess water from the planter. Of course, a newly designed planter which incorporates the present system will have no drain holes to plug.

In either event, plant owners will be able to provide the desired saturation phase of proper plant maintenance, without the inconvenience, potential mess, and even physical challenge of "dunking" a planter in a secondary reservoir. Furthermore, the method prescribed by the present invention allows for the collection of water which is removed from a planter, which water may contain valuable nutrients by way of previously added fertilizer solutions, etc.

Tests by the present inventor clearly demonstrate the degree to which potted plants, when damaged through use of planters of the present invention, thrive to never-before experienced levels. In such tests, house plants were removed from standard containers and placed in planters of the present invention. The plants were cyclically saturated with water by filling the planters with water, then dehydrated by draining the planters through their respective conduits, and allowing the soil to dry. No larger receptacles were needed to immerse the planters, no spills from overflowing planter reservoirs were experienced, and the subject plants thrived as never before seen by the present inventor, no doubt, as a result of the much more natural cycle of hydration and dehydration first made practical through use of planters of the present invention.

BRIEF DESCRIPTION OF THE DRAWINGS

FIG. 1 is an elevational, schematic side view of a water reservoir and a first segment of a water siphon tube of the present invention.

FIG. 2 is an elevational side view of a second, detachable segment of a water siphon tube of the present invention.

FIG. 3 is a side elevational view of a suction application device for use with the system of the present invention.

FIG. 4 is a side elevational, sagittal cross sectional view of a planter with the system of the present invention incorporated therein.

PHYSICAL SPECIFICATIONS OF A PREFERRED EMBODIMENT

Figure 5:
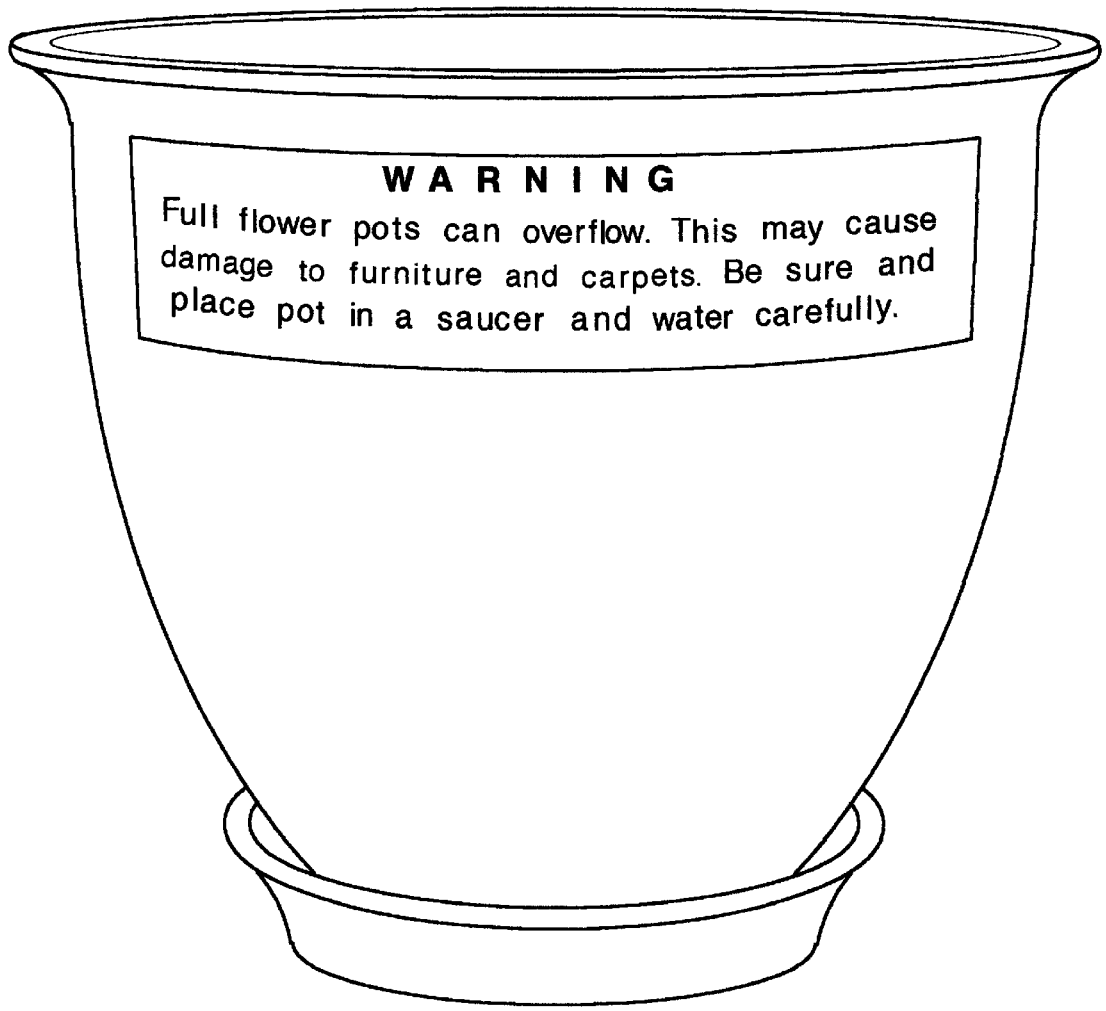
FIG. 5 is a photograph of a conventional ceramic planter which illustrates a primary problem overcome by the present invention—that of danger of leakage from use of conventional planters, if one is to properly hydrate the plant which is placed in the planter.

Referring to FIGS. 1 and 2, the preferred embodiment of the planter system of the present invention includes, at its heart, a water reservoir 10 and water siphon tube 12. Water ejaculation tube 12 is preferably of a substantially clear plastic material, to permit visualization of the flow of liquid through the tube 12, particularly when verifying the initiation of the syphoning flow through use of the suction application device (to be identified below).

In the preferred embodiment of the present invention, water siphon tube 12 is comprised of two tubular segments, a proximal or first segment 14 and distal or second segment 16. First segment 14 and second segment 16 are reversibly engageable to form a sealed, effectively unitary conduit.

Water reservoir 10 may either simply rest on the interior bottom surface of an existing planter, in which case it must be a completed enclosed, although perforated, structure, or be physically attached (or, in the case of a new planter into which the present system is incorporated, molded into the planter itself). In any event, the water reservoir 10 should reside at the very bottom (and preferably center) of a planter into which it is installed or incorporated.

Referring additionally to FIG. 4, as described in the Summary of the Invention, water siphon tube 12, whether a single length of tubing, or comprised of multiple segments as in the preferred embodiment, should be of sufficient length to extend from the water reservoir 10, up the interior side of a planter A, over the top edge B of planter A, and down the outside surface C of planter A to extend to a point below the bottom surface D of planter A. This length is necessary to effect the syphoning action which is part of use of the present system.

Referring to FIG. 3, a suction application device 18 is used to initiate the above-referenced syphoning action. Virtually any "rubber" bulb will suffice for this purpose, so long as its capacity is such that it will draw water from planter A, through water siphon tube 12, and to a level which initiates the syphoning action described above.

There are some situations involving plants that completely envelope planters (such as ferns in hanging baskets). In such instances, it is difficult to see when the planter has been filled with water. If a clear conduit is affixed to the outside wall (not shown in any of the drawings), and such conduit is in fluid communication with the interior of the planter near its bottom, the water level inside the planter would be indicated by a water level which is visible in the conduit and of equal elevation to that inside the planter. Although this arrangement might be used in the case of hanging baskets, the addition of an aperture and conduit reduces the simplicity, increases the cost of production, can create a leakage problem, can be easily damaged, and may be cosmetically unattractive.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A planter modification system for modifying a conventional planter to facilitate draining of water from the planter after a soaking period during which the water has been filled above the soil level and substantially all air bubbles have dissipated, the modification system comprising:

a water reservoir compartment having an outer perforated shell member which defines and delineates an interior water reservoir compartment space, said water reservoir compartment to have all interior surfaces smooth and unobstructed to avoid impeding the flow of water from said water reservoir compartment, said water reservoir compartment to have a capacity of 15 to 20% of the total amount of water needed to fill an empty planter to the anticipated soil level, said water reservoir compartment to be perforated with holes 1/16" to 3/16" in size with 6 to 8 holes per square inch for surfaces covered by soil, said water reservoir compartment to have an outlet at the bottom of said water reservoir compartment, the outlet to accommodate a water siphon tube member from 1/4 inch to 3/8 inch inside dimension;

a water siphon tube member, a proximal water siphon tube member end of which is in sealed fluid communication with said interior water reservoir compartment space said water siphon tube member to be 1/4 inch to 3/8 inch inside dimension; and Suction application means having junction means with said water siphon tube member, said suction means drawing water from said water reservoir compartment to the distal end of said water siphon tube member, the change in atmospheric pressure within said water siphon tube member thereby initiating a siphoning action.

2. A planter modification kit for modifying a conventional planter to facilitate draining of water from the planter after a soaking period during which the water has been filled above the soil level and substantially all air bubbles have dissipated, the modification system comprising:

a water reservoir compartment having an outer perforated shell member which defines and delineates an interior water reservoir compartment space, said water reservoir compartment to have all interior surfaces smooth and unobstructed to avoid impeding the flow of water from said water reservoir compartment, said water reservoir compartment to have a capacity of 15 to 20% of the total amount of water needed to fill an empty planter to the anticipated soil level, said water reservoir compartment to be perforated with holes 1/16" to 3/16" in size with 6 to 8 holes per square inch for surfaces covered by soil, said water reservoir compartment to have an outlet at the bottom of said water reservoir compartment, the outlet to accommodate a water siphon tube member from 1/4 inch to 3/8 inch inside dimension; and a water siphon tube member, a proximal water siphon tube member end of which is in sealed fluid communication with said interior water reservoir compartment space said water siphon tube member to be 1/4 inch to 3/8 inch inside dimension, said water siphon tube member being of sufficient length to extend at least from its juncture with said water reservoir compartment along an interior side of said existing planter over the upper edge of said existing planter and downward on the outside of said existing planter to a point below the bottom of said existing planter;

suction application means having junction means with said water siphon tube member, said suction means drawing water from said water reservoir compartment to the distal end of said water siphon tube member, the change in atmospheric pressure within said water siphon tube member thereby initiating a siphoning action.

\* \* \* \* \*